March 5, 1963

S. M. RUBENS 3,080,549

MAGNETIC CORES

Filed March 25, 1957

INVENTOR
SIDNEY M. RUBENS

BY Cushman Darby & Cushman
ATTORNEYS

United States Patent Office
3,080,549
Patented Mar. 5, 1963

3,080,549
MAGNETIC CORES
Sidney M. Rubens, St. Paul, Minn., assignor to Sperry Rand Corporation, New York, N.Y., a corporation of Delaware
Filed Mar. 25, 1957, Ser. No. 648,091
15 Claims. (Cl. 340—174)

This invention relates to metallic ribbon cores which are especially adaptable for the non-destructive sensing of the magnetic state thereof.

As used herein, the term "non-destructive sensing" of the state of magnetic cores refers to the detection of the relative direction of remanent flux in a magnetic core without destroying or reversing such remanent flux. This is not to say, however, that the remanent flux in accordance with this invention is not changed at least temporarily during the non-destructive sensing thereof, since as will become apparent hereinafter, the temporary change in the remanent flux, whether in one direction or the other, provides the desired indicative output.

As the use of magnetic cores in digital computing machinery becomes increasingly popular, one desire of those attempting to increase the computational speeds of these machines is to obtain magnetic cores which may be non-destructively sensed. In retaining recorded data, non-destructive sensing eliminates the restoration cycle usually required with static magnetic memories.

Generally in some digital machine applications magnetic material used in the cores preferably exhibits a rectangular hysteresis characteristic so that the residual flux density is a relatively large percentage of the flux density during application of a saturating magnetomotive force. A number of suitable magnetic materials are available such as "Permalloy," and certain ferromagnetic ferrites. "Permalloy" is preferably used as thin insulated strips wrapped around the circumference of miniature spools thereby improving the high frequency response by reducing eddy current losses. Such cores are commonly referred to as metallic ribbon cores.

In non-destructively sensing the state of metallic ribbon cores, electrical current may be passed through the ribbon thereby inducing a magnetic field orthogonal to the remanent magnetization which causes sufficient disturbance in said remanent magnetization to induce a detectable voltage in a sense winding. This disturbance is insufficient to switch the remanent magnetization of a core exhibiting a rectangular hysteresis loop provided the leads are brought out in such a manner that the net component of the magnetic field due to the leads is negligible along the length of the core. In a coiled core such component is generally referred to as the circumferential field and will be so referred to herein in a generic sense without limitation intended. The circumferential field phenomena are explained by D. A. Buck and W. I. Frank in their article "Non-Destructive Sensing of Magnetic Cores," Communications and Electronics, January 1954, on page 822.

One difficulty in this method of non-destructive sensing is keeping the net field due to the leads for the interrogating or sensing current close to zero. A field which may be sufficient to switch the core may be generated by the interrogating current in the electrical lead attached to the innermost end of the ribbon.

This invention obviates the lead or circumferential field referred to above by providing a magnetic core which has both of the electrical terminals thereof on one side of a coil. In one preferred embodiment, this is accomplished by providing a length of ribbon-like material and folding same at substantially its mid-point. The folded length is then wrapped or coiled around a bobbin with the ends of the length being secured to terminal means disposed in the bobbin. Current is then provided to the terminal means so that the current will traverse the full length of the folded magnetic material to provide a quadrature flux for sensing the remanent flux in the length of magnetic material. The terminal means in their connection to the current so used extend from one end of the bobbin and cannot, therefore, produce circumferential or other adverse fields.

Accordingly, it is one object of this invention to provide an improved ribbon-like magnetic core suitable for non-destructive sensing.

Another object of this invention is to provide magnetic core non-destructive sensing apparatus wherein the ends of the ribbon-like material used for the core are disposed both on the same side of the coil forming the core.

Another object of this invention is to provide apparatus for non-destructive sensing of a coiled magnetic core including means for applying sensing current to the coiled core and invariably generating a net zero magnetic field along the circumference of the core.

Another object of this invention is to provide a magnetic core including a length of ribon-like material folded at substantially its mid-point so that the halves thereof are lying adjacent each other with the resultant halves being coiled, whereby the ends of the length are disposed on the inward side of the coil for connection thereto of means to cause a current to flow throughout the length of the material.

A further object of this invention is the provision, in conjunction with the preceding object, of terminals disposed in bobbin-like means for securing the ends of said length to the bobbin and for making the connection to the current producing means.

Still other objects of this invention will become apparent to those of ordinary skill in the art by reference to the following detailed description of exemplary embodiments of the apparatus and the appended claims. The various features of the exemplary embodiments according to the invention may be best understood with reference to the accompanying drawings, wherein:

Figure 1:
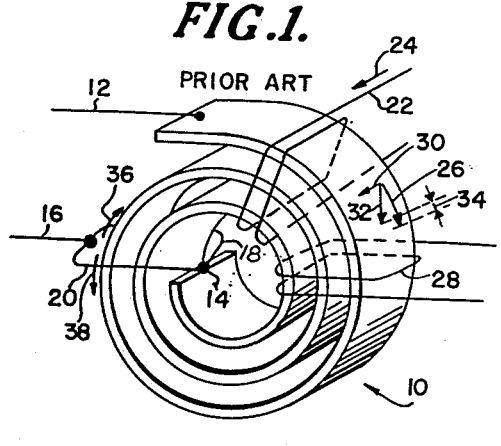
FIGURE 1 illustrates in perspective view a ribbon core in accordance with the prior art.

The prior art is shown in FIGURE 1 for convenience in explaining the operation of the present invention. The metallic ribbon type memory core of FIGURE 1 is shown in conventional coil form, but the usual bobbin associated therewith is not illustrated so that the operation of the core may be better described. To the outer end of the magnetic ribbon 10 is connected a conductor wire 12 for purposes of introducing current through the coiled length of the ribbon. At the other end 14 of the ribbon, which is inside the coil, other current leads are attached so as to cause current to exit on line 16. At the terminal end 14 of the ribbon, the lead line 16 is formed by two branches 18 and 20, one of which passes on one side of the coil and the other of which passes on the other side of the coil. These branches combine into the external line 16.

Since the metallic ribbon used for the core has rectangular hysteresis loop characteristics, the core will have its remanent magnetization along an easy axis or direction of magnetization. The core is formed such that an easy axis is along the length thereof, and when current is passed through the magnetizing winding 22 in the direction of arrow 24, a remanent flux is set up in the core in the direction shown by vector 26. An output winding 28 is used to determine the direction of the remanent magnetization in the core when sensing or interrogating current is caused to flow through the length of the core itself. That is, when current enters line 12 and exits through line 16, the output winding has a voltage induced therein which indicates the direction of the remanent magnetization. Current flowing in on line 12 creates a quadrature flux as shown by vector 30. This flux tends to cause the remanent flux to tend to rotate into alignment with the quadrature flux. Such rotation is indicated by vector 32. Since the quadrature flux is in what might be termed a "hard direction," while the remanent flux lies along the easy axis of magnetization, the rotation of the remanent flux is comparatively small in magnitude and as soon as the current on line 12 ceases, the remanent flux returns to its original direction. The output winding sees the change of flux only in the direction tangential to the outer curvature of the coil, that is, in the direction of easy magnetization, so that when the remanent flux is rotated to the degree shown by vector 32, the change in remanent magnetization which produces the voltage is that indicated by vector 34. This small change of flux ideally occurs just as rapidly as current in line 12 can build up. The voltage induced in the output winding is proportional to the time rate of change in the flux which the output winding sees. Therefore, although the tangential flux change 34 is relatively small, the voltage output from winding 28 might be quite large as the change can be made to take place in a very short time.

Upon the exit of current from the length of magnetic core to line 16, the current traverses the parallel branches 18 and 20. In each branch, flux is created. From current through branch 18, flux is induced in the upward direction as indicated by vector 36, while current through branch 20 induces flux in a downward direction as indicated by vector 38. As long as the flux vectors 36 and 38 are of equal magnitude so as to effectively cancel each other, no problem arises. However, since the resistances in the interrogation circuit including the magnetic core itself as current traverses therethrough, are small, slight resistance variations in leads 18 and 20 cause a considerable change in the manner in which current divides between these leads. Therefore, objectionable circumferential fields of sufficient magnitude to switch the core in the presence of an interrogating quadrature field may be present. Since it is desirable to sense the state of the magnetic core without switching the core, the circumferential fields so produced are objectionable. Another problem, aside from the critical resistance values of the leads 18 and 20, is that these leads appear as a shorted turn since they surround the core. This gives rise to adverse loading effects.

Figure 2:
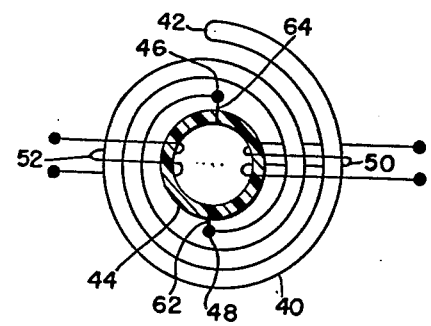
FIGURE 2 illustrates a schematic and diagrammatic elevational view of the magnetic core in accordance with this invention.

The present invention as diagrammatically illustrated in FIGURE 2, overcomes the above problems. In manufacturing the magnetic core which may be non-destructively sensed, a length of metallic ribbon 40 is made into two portions of substantially equal length. This may be accomplished by folding the length at approximately its mid-point, or alternatively, electrically connecting two strips of magnetic material of approximately equal length together at one of their ends, such as at point 42, by welding or other suitable means. With the two strips or folded length portions lying adjacent each other and suitably insulated, the length is wrapped around a bobbin 44 starting with the open ends or terminals 46 and 48 of the full length next to the bobbin. Preferably, as will be later discussed, the terminals 46 and 48 lie on a diameter of the bobbin. However, it is to be understood that the terminal ends may be disposed at any other position around the bobbin. As an alternative, the folded point 42 may lie next to the bobbin with the ends 46 and 48 being on the outside of the coil. A magnetizing winding 50 and output winding 52 may be added to the assembly for purposes similar to that above explained for similar type windings.

As above indicated, the length of magnetic ribbon has two portions at least electrically interconnected. Throughout this specification and in the claims, phrases similar to "two portions at least electrically interconnected," as at point 42, are intended to include both the situation where the length is of a single strip folded and the situation where two separate strips are connected together to form the length, unless otherwise expressly stated. The remainder of the description will proceed with reference to a folded strip or ribbon for convenience in explaining the invention, but limitation thereto is not intended.

Upon magnetizing the folded ribbon with current in the magnetizing winding 50, remanent flux is set up in the core in a given direction along its folded length. When sensing current is introduced, for example at terminal 48, the current flows throughout the full length of the ribbon and exits through the opposite terminal 46. The sensing current produces a quadrature flux, and as in the prior art, tends to rotate the remanent flux into alignment therewith. The tangential change in the remanent flux induces a voltage in the sensing winding in one direction or the other in accordance with the direction of the remanent flux to produce a signal indicative of the state of the magnetic core. Even though sensing current flows in adjacent layers of the magnetic ribbon in opposite directions, so as to tend to rotate the remanent flux therein in opposite directions, there is no cancellation effect. As above explained, the output winding sees only the change of flux in the tangential direction.

Figure 3:
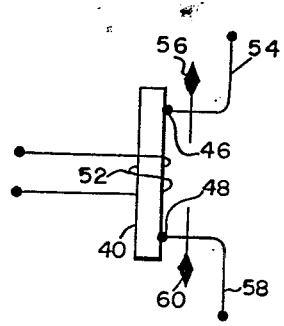
FIGURE 3 is a side elevational view of the core of FIGURE 2 showing schematically the balance of fluxes therein produced.

With reference to FIGURE 3 which is a view of the core of FIGURE 2 from a side thereof so as to illustrate the entry and exit of the leads connected to terminals 46 and 48, it will be apparent that the problem of a net circumferential flux does not exist. With winding current entering lead 54 so as to cause a quadrature flux in core 40, the flux produced by lead 54 is as shown by vector 56. Upon complete traversal of the current through core 40, its exit on line 58 via terminal 48 creates a flux such as that shown by vector 60. Since the same current flows in line 54 as does in line 58, the flux vectors 56 and 60 will be of the same magnitude, and since they are in opposite directions, will completely cancel each other. Therefore, the net circumferential flux tended to be produced thereby is negligible if not completely absent. Differences in the resistances of the lead-in and lead-out connectors 54 and 58 are not as critical as for the parallel branch members 18 and 20 of FIGURE 1.

Figure 4:
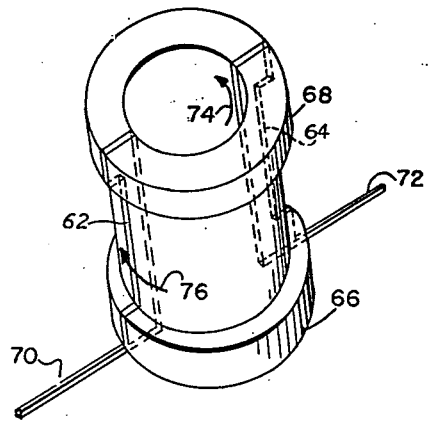
FIGURE 4 is a perspective view of a magnetic core showing the inward connection of the coiled core.

FIGURE 4 shows in greater detail a metallic ribbon type magnetic core in accordance with this invention. The terminals 46 and 48 of the length of the folded ribbon of FIGURE 2 are secured to the bobbin by any desirable means, such as shown in FIGURE 2 diagrammatically by the elements 62 and 64 which are inserted into the bobbin. In FIGURE 4, the securing elements 62 and 64 are shown as U-shaped pieces which are crimped or embedded in the rims 66 and 68 of the bobbin as well as in the cylindrical central portion of the bobbin. The ends 46 and 48 of the core material are welded or otherwise connected to the securing elements 62 and 64, respectively, so as to allow a tight wind of the ribbon about the bobbin. The elements 62 and 64 are preferably electrical conductors and have attached thereto at one end of the bobbin, leads 70 and 72 respectively. These leads may be the same piece of wire as conductors 62 and 64, or alternatively, may be welded or otherwise electrically secured thereto. The arrangement of the leads is similar to that diagrammatically shown in FIGURE 3. Therefore, the flux produced by current through the leads does not adversely affect the magnetic core. It will be noted that current through the connecting conductor 64 due to current into lead 72 will cause a circumferential field in accordance with flux vector 74. However, the same current exiting via lead 70 produces in connecting conductor 62 an opposing circumferential flux indicated by vector 76. These two circumferential fluxes will completely balance each other so as to provide a zero net circumferential flux.

As above indicated, the disposition of the ends of the coil of magnetic material is preferably on a diameter of a bobbin in the manner illustrated in FIGURES 2 and 4. In this case, the two portions of the folded length of magnetic material will be different in length by an amount approximately equal to one-half the circumference of the bobbin. However, it is not essential that the terminals of the magnetic core be disposed on a diameter, but may be adjacent each other at any angle around the bobbin without there being and adverse magnetic or electrical effects produced.

Thus it is apparent that there is provided by this invention systems in which the various phases, objects, and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A magnetic memory core circuit comprising first and second juxtaposed pieces of magnetic material both having rectangular hysteresis loop characteristics and remanence in the same direction, at least one winding disposed about both pieces, and means for effecting in said winding a signal indicative of the direction of remanence in the magnetic material including means for passing equal electric current simultaneously through the first and second pieces in opposite directions, both of which are substantially parallel to said same direction.

2. A circuit as in claim 1 wherein said means includes an electrical interconnection between the pieces at one end thereof and terminals at the other ends thereof for connection to a source, whereby a single current from the source provides the equal and opposite current in the pieces.

3. A magnetic core comprising a coiled length of ribbon-like material having rectangular hysteresis loop characteristics, said length having two electrically interconnected portions of substantially equal lengths overlyingly adjacent each other substantially throughout said coiled length with each of said portions as coiled separating adjacent turns of the other, both said coiled portions having remanent flux in the same direction, and means connected at opposite ends of said length for passing current through said length, the arrangement being such that said current produces a flux at an angle to the remanent flux of said material.

4. Apparatus as in claim 3 wherein the flux produced by said current has at least in effect only a quadrature relationship with the remanent flux of said material.

5. Magnetic core nondestructive sensing apparatus comprising a core in the form of a length of ribbon-like magnetic material having first and second portions substantially equal in length and overlyingly adjacent each other, one end of the first portion being electrically interconnected with an adjacent terminal end of the second portion and thereby forming a series electrical circuit through the extent of said first and second overlying portions respectively, said portions having a remanent flux in the same direction, means for passing current serially through the extent of the first and second adjacent overlyingly arranged portions with the current flowing in opposite directions through the first and second portions respectively for producing a sensing flux at an angle to said remanent flux to cause a change in the remanent flux, and means to detect at least a portion of said change.

6. Apparatus as in claim 5 wherein the sensing flux is produced effectively only in a quadrature relationship with said remanent flux and the change caused thereby is a reversible change.

7. Apparatus as in claim 5 wherein said two ribbon-like portions are coiled with each portion separating adjacent turns of the other portion and wherein the sensing flux producing means includes means for passing a current through said length.

8. A system as in claim 7 wherein the other end of each said portion forms one of two terminal ends of said length and are inside the coil.

9. Apparatus as in claim 7 wherein the other ends of said portions are on the inner circumference of the coil.

10. Magnetic core nondestructive sensing apparatus comprising a length of ribbon-like magnetic material having rectangular hysteresis loop characteristics and forming a magnetic core, said length having first and second serially arranged portions, said portions being electrically connected along one of the mutually adjacent terminal end points, said portions being of substantially equal lengths and disposed in overlyingly adjacent relationship to each other in coil form with the turns of each portion separating adjacent turns of the other portion, means for creating a remanent flux in the same direction along each of said portions, means for passing a current serially through the length of said first and second portions respectively with the current flowing in opposite directions through adjacent turns of said first and second portions to produce a sensing flux at an angle to said remanent flux to cause the remanent flux to align therewith, by means to direct a change of remanent flux along the length of said material.

11. Apparatus as in claim 10 wherein the current passing means produces said sensing flux effectively in only a quadrature relationship with said remanent flux.

12. Apparatus as in claim 10 wherein said two portions of ribbon-like material are coiled around bobbin-like means including terminal means for securing thereto both ends of said length of magnetic material, said terminal means being connected to the means for passing current through the length of said material and being disposed transversely of said length.

13. Apparatus as in claim 12 wherein the terminal means are diametrically opposed in said bobbin-like means.

14. Apparatus as in claim 12 wherein the terminal means extend from the same end of the bobbin-like means.

15. A magnetic core comprising ribbon-like ferromagnetic material having rectangular hysteresis loop characteristics and being in the form of a strip returned back on itself and providing two portions of substantially equal lengths lying adjacent and parallel to each other, said returned strip having a remanent magnetization axis along the length thereof and being of coil form.

References Cited in the file of this patent

UNITED STATES PATENTS

| | | |
|---|---|---|
| 2,278,744 | Sparrow | Apr. 7, 1942 |
| 2,723,353 | Spitzer et al. | Nov. 8, 1955 |
| 2,743,507 | Kornei | May 1, 1956 |
| 2,814,794 | Bauer | Nov. 26, 1957 |
| 2,982,947 | Kilburn et al. | May 2, 1961 |

FOREIGN PATENTS

| | | |
|---|---|---|
| 1,105,870 | France | July 13, 1955 |

OTHER REFERENCES

"A New Nondestructive Read for Magnetic Cores," by R. Thorenson and W. R. Arsenault, 1955 Western Joint Computer Conference, published August 1955, pp. 111–116. (Copy in Div. 42.)

"Non-destructive Sensing of Magnetic Cores," by D. A. Buck and W. I. Frank in "Communications and Electronics" for January 1955, pp. 822–830. (A copy is in the Patent Office Library.)